No. 872,850. PATENTED DEC. 3, 1907.
F. A. ROWEKAMP.
HAY BALER.
APPLICATION FILED FEB. 28, 1907.
3 SHEETS—SHEET 2.
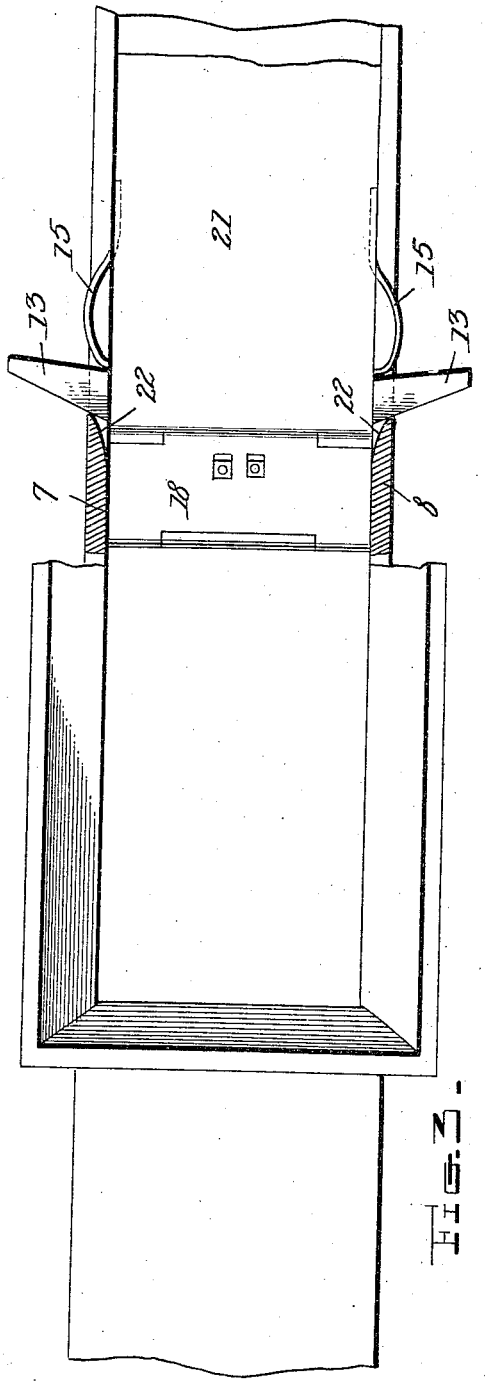
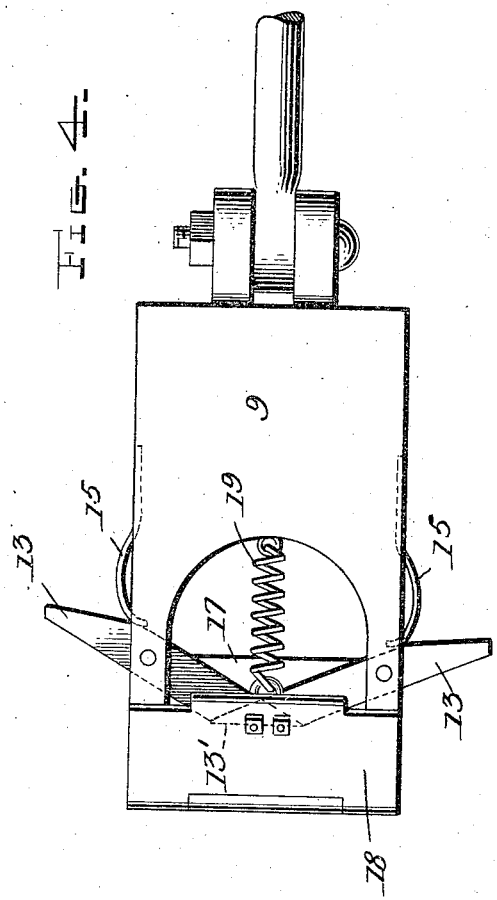
Witnesses
Inventor
Frank A. Rowekamp.
By
Attorneys No. 872,850. PATENTED DEC. 3, 1907.
F. A. ROWEKAMP.
HAY BALER.
APPLICATION FILED FEB. 28, 1907.
3 SHEETS—SHEET 3.
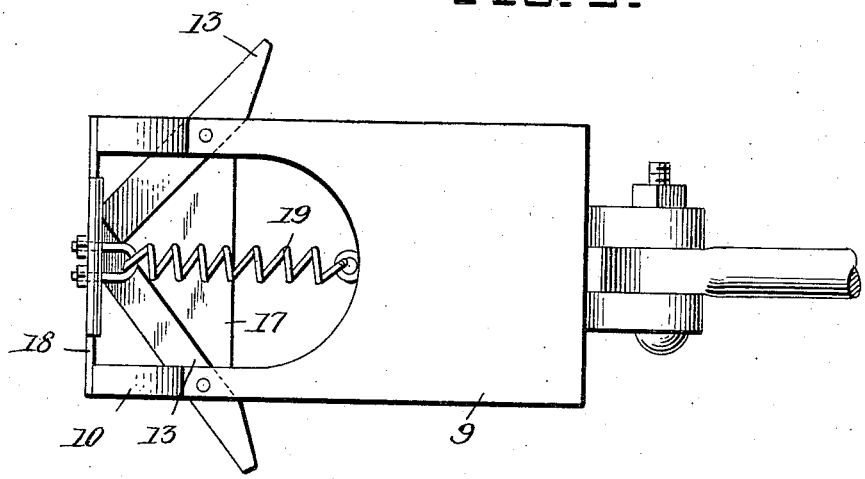
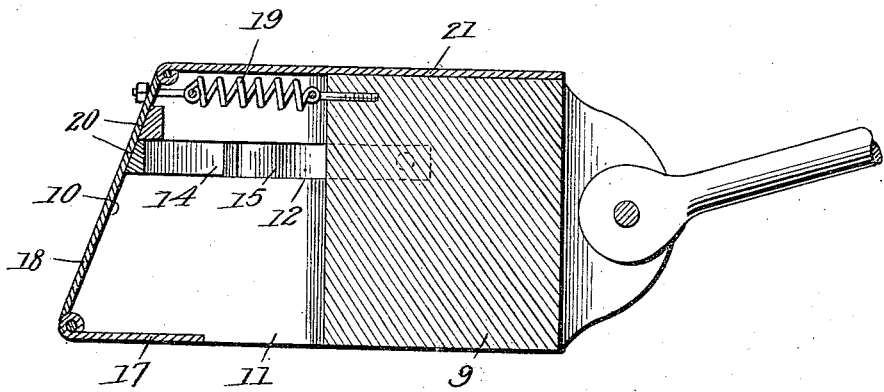
Inventor
Frank A. Rowekamp.
Witnesses
Jas. A. Kachl
L. M. Curry.
By Chandlee & Woodward
Attorneys

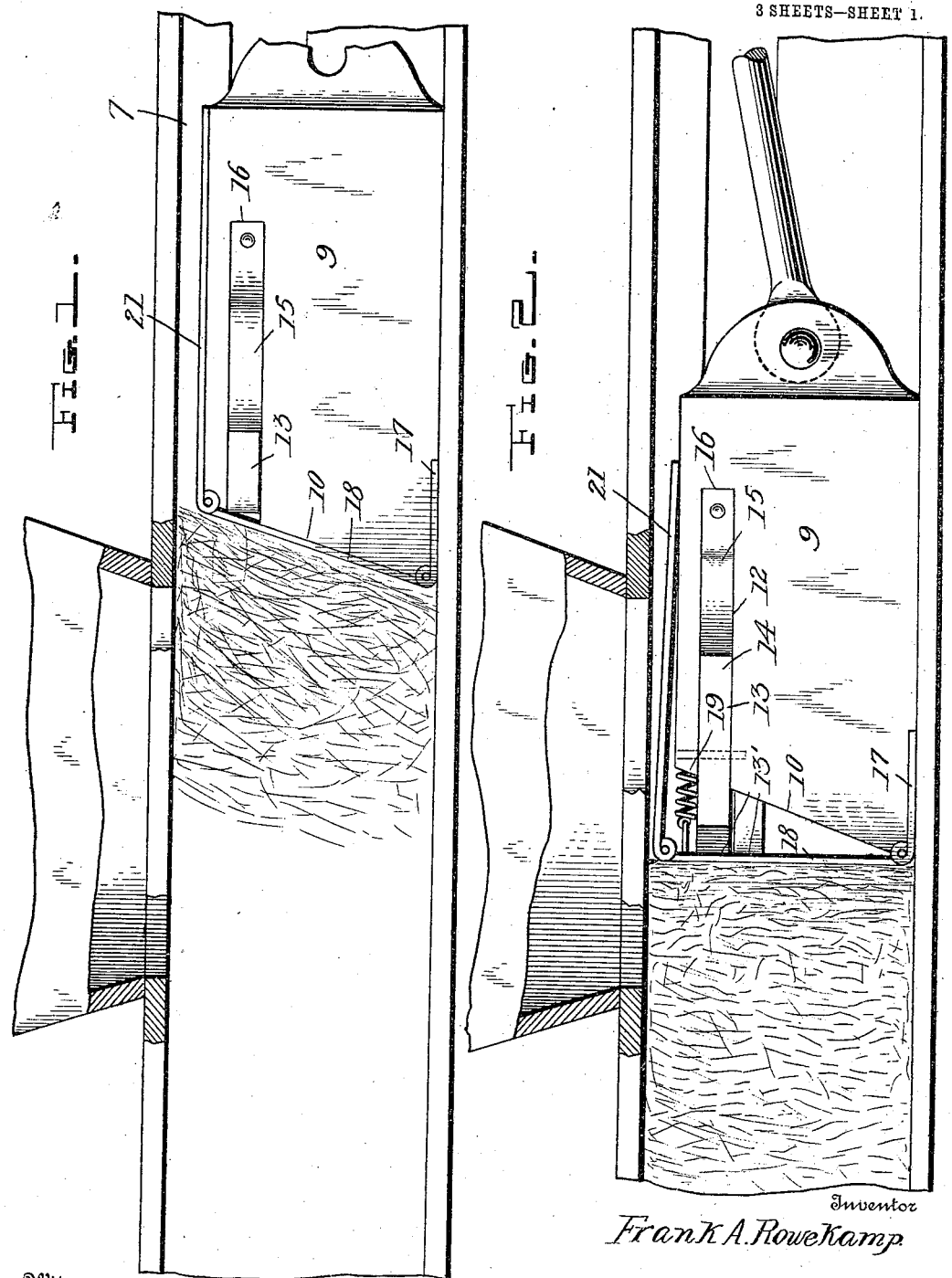

UNITED STATES PATENT OFFICE.

FRANK A. ROWEKAMP, OF WITAKA, MINNESOTA.

HAY-BALER.

No. 872,850.　　　Specification of Letters Patent.　　　Patented Dec. 3, 1907.

Application filed February 28, 1907. Serial No. 359,873.

*To all whom it may concern:*

Be it known that FRANK A. ROWEKAMP, a citizen of the United States, residing at Witaka, in the county of Winona and State of Minnesota, has invented certain new and useful Improvements in Hay-Balers, of which the following is a specification.

This invention relates to hay balers and more particularly to plungers thereof, and has for its object to provide a plunger so arranged as to assume a shape at its inner end when withdrawn, to facilitate the introduction of hay to the baling chamber.

Another object is to provide a structure of this sort which will be simple and which may be applied to plungers of balers already in use.

Other objects and advantages will be apparent from the following description, and it will be understood that changes in the specific structure shown and described may be made within the scope of the claims, and that any suitable materials may be used, without departing from the spirit of the invention.

In the drawings forming a portion of this specification and in which like numerals of reference indicate similar parts in the several views:—Figure 1 is a view showing a portion of a hay baler provided with the present invention, one wall of the baling chamber being removed, and the plunger being withdrawn, Fig. 2 is a view similar to Fig. 1 with the plunger in pressing position, Fig. 3 is a top plan of the parts in the position shown in Fig. 1, both walls of the baling chamber being shown, Fig. 4 is a view of the plunger with the top plate removed, the front plate being in slanting position, Fig. 5 is a view similar to Fig. 4 with the front plate in upright position. Fig. 6 is a longitudinal section through the plunger.

Referring now to the drawings there is shown a baling chamber including parallel side walls 7 and 8. A plunger 9 is arranged for movement between the walls, in the usual manner, and the inner end of the plunger is slanted downwardly and inwardly, as shown at 10. A recess 11 is formed in the forward end of the plunger, and opens through the upper and under faces.

Longitudinally extending slots 12 are formed in the side walls of the recess 11 and open through the inner end of the plunger, these slots registering transversely of the plunger and in each of these slots there is mounted a lever 13 for horizontal pivotal movement. As shown in the drawings, these levers are movable into position to extend longitudinally of the plunger, when they lie with their ends 13' projected beyond the inner end of the plunger and with their ends 14 in the slots 12. The levers are held normally out of the just described position, however, by strap springs 15 set in recesses 16 in the side faces of the plunger and arranged for engagement of their free ends by the end portions 14 of the levers 13 as shown. These end portions 14 thus project normally beyond the sides of the plunger.

A plate 17 is secured to the under face of the plunger at the inner end thereof, and closes a portion of the recess 11. A front plate 18 is hinged at its lower end to the plate 17 for movement into and out of position to rest against the slanting inner end of the plunger, and a helical spring 19 is secured to this front plate and to the rearward wall of the recess 11, to hold the plate yieldably in slanting position and against the inner end of the plunger. The front plate 18, when in normal position, thus lies in the path of movement of the inner ends 13' of the levers 13 when the latter are moved into longitudinally extending position and these ends of the levers are beveled as at 20, adjacent to the front plate in order to present a broad bearing surface thereto. It will thus be apparent that when the outer ends 14 of levers are moved inwardly to bring the levers into longitudinally extending position, the inner ends of the levers will engage the front plate 18 to move it against the action of the spring 19, and the arrangement is such that the front plate is thus brought into vertical position.

A top plate 21 is hinged to the upper edge of the front plate 18, and rests upon the upper face of the plunger, this plate being free to slide with the movement of the front plate.

It will thus be apparent that when the plunger is moved inwardly to compress a bale, the levers 13 will be brought into engagement with the side walls 7 and 8 of the baling chamber, and moved inwardly to bring the front plate into vertical position, thus presenting a straight face against the matter to be compressed. When the plunger has been retracted, to bring the levers outwardly of the baling chamber, the front plate will be moved in a diagonal position, to slant upwardly and outwardly thus presenting wider space for the introduction of material as well as an inclined surface to facilitate such introduction. This arrangement insures full packing of matter in the angle between the lower portion of the plunger and the bottom of the baling chamber which, with the usual form of press is rarely if ever fully packed. As shown, the walls 7 and 8 of the baling press are diagonally recessed at 22 to present slanting faces at the points at which they are engaged by the levers 13.

What is claimed is:—

1. In a baling press, the combination with a baling chamber and a plunger movable in the chamber, of a front plate pivoted to the inner end of the plunger for movement into and out of vertical position and levers pivoted in the plunger and arranged for operation to bring the front plate into vertical position, said levers being disposed for engagement of the walls of the baling chamber for movement when the plunger is moved in the chamber.

2. In a baling press, the combination with a plunger, of a hay-engaging member connected with the inner end of the plunger for movement to lie at times in diagonal position and at times in vertical position, and a lever pivoted in the plunger and arranged for operation to move the hay-engaging member.

3. In a baling press, the combination with a baling chamber and a plunger movable in the baling chamber, of a front plate pivoted to the inner end of the plunger for movement into and out of vertical position, and means for coöperation with the walls of the baling chamber to move the front plate into vertical position when the plunger is moved to compress a bale.

4. In a baling press, the combination with a baling chamber and a plunger movable in the chamber, of a front plate pivotally connected with the plunger for movement to lie at times in upwardly and outwardly slanting position, and at times in vertical position, means for holding the front plate in slanting position, and means movable to bring the front plate into vertical position, said means being arranged for engagement of the baling chamber when the plunger is moved to compress a bale, for movement of said means to bring the front plate into vertical position.

5. The combination with a plunger for baling presses of a plate secured to the under face of the plunger, a front plate hinged to the forward end of the first mentioned plate for movement to extend at times in vertical and at times in diagonal position, means for holding the front plate normally in diagonal position, means for moving the front plate into vertical position and a top plate hinged to the front plate and resting upon the plunger.

6. The combination with a plunger for baling presses having a slanted inner end and having a recess in said end opening through the upper and lower faces of the plunger, of a plate secured to the under face of the plunger to close the bottom of said recess, a front plate hinged to the first mentioned plate for movement toward and away from the slanted end of the plunger, means located in the recess for moving the front plate, and a top plate hinged to the front plate and slidably disposed upon the plunger to close the upper end of the recess.

In testimony whereof I affix my signature in presence of two witnesses.

FRANK A. ROWEKAMP.

Witnesses:
D. E. TAWNEY,
MAUDE R. WHITE.